May 6, 1952  C. R. FRIESNER  2,596,071
BRICK PACK
Filed Aug. 17, 1949  5 Sheets-Sheet 1
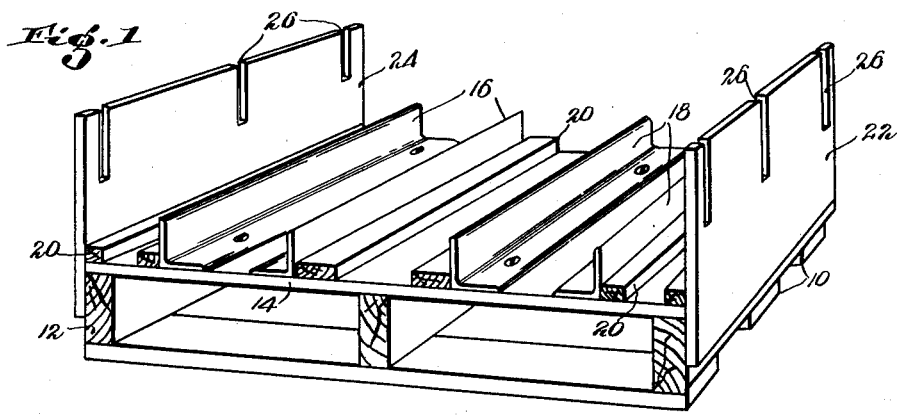
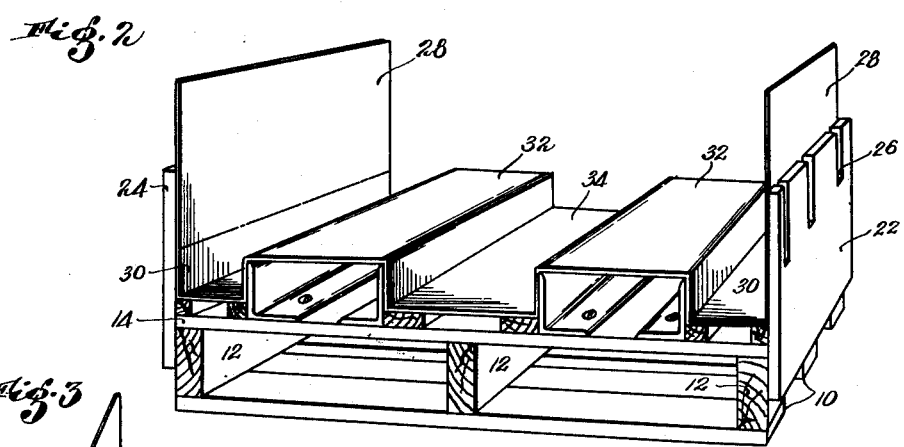
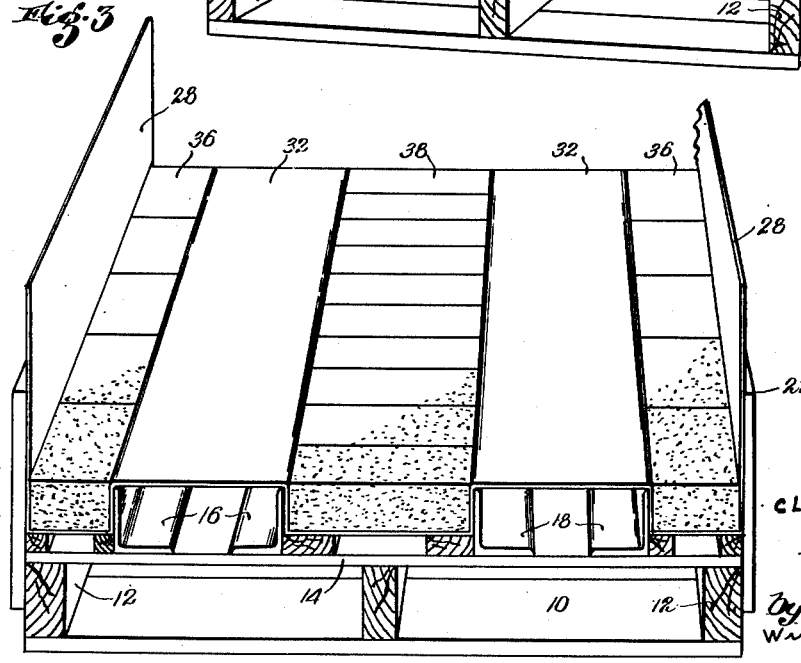
CLAUDE R. FRIESNER
Inventor May 6, 1952 C. R. FRIESNER 2,596,071
BRICK PACK
Filed Aug. 17, 1949 5 Sheets-Sheet 2

CLAUDE R. FRIESNER
Inventor

May 6, 1952  C. R. FRIESNER  2,596,071
BRICK PACK
Filed Aug. 17, 1949  5 Sheets-Sheet 3
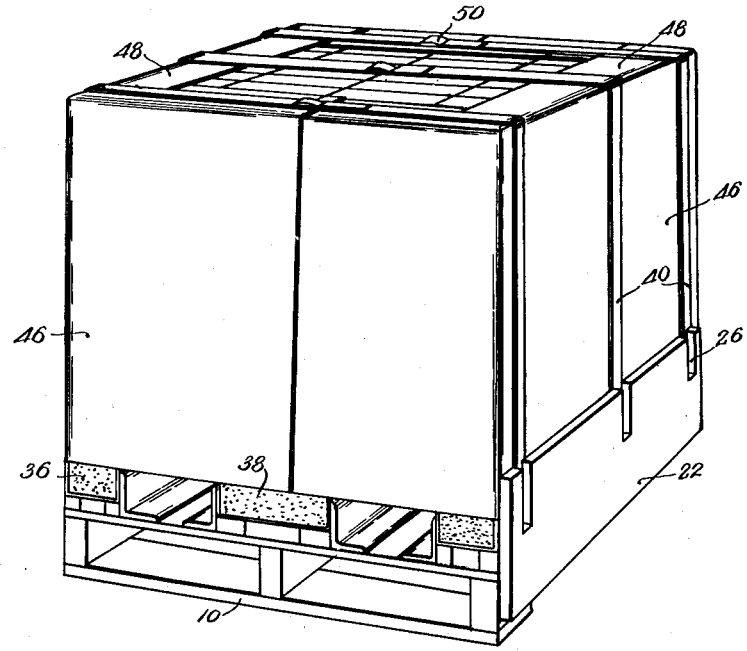
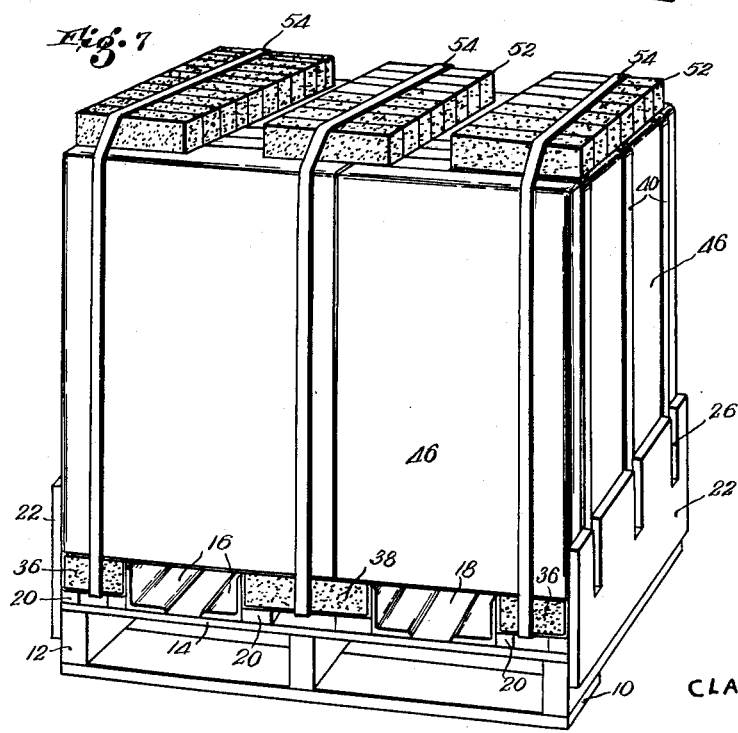
CLAUDE R. FRIESNER
Inventor May 6, 1952 C. R. FRIESNER 2,596,071
BRICK PACK
Filed Aug. 17, 1949 5 Sheets-Sheet 4
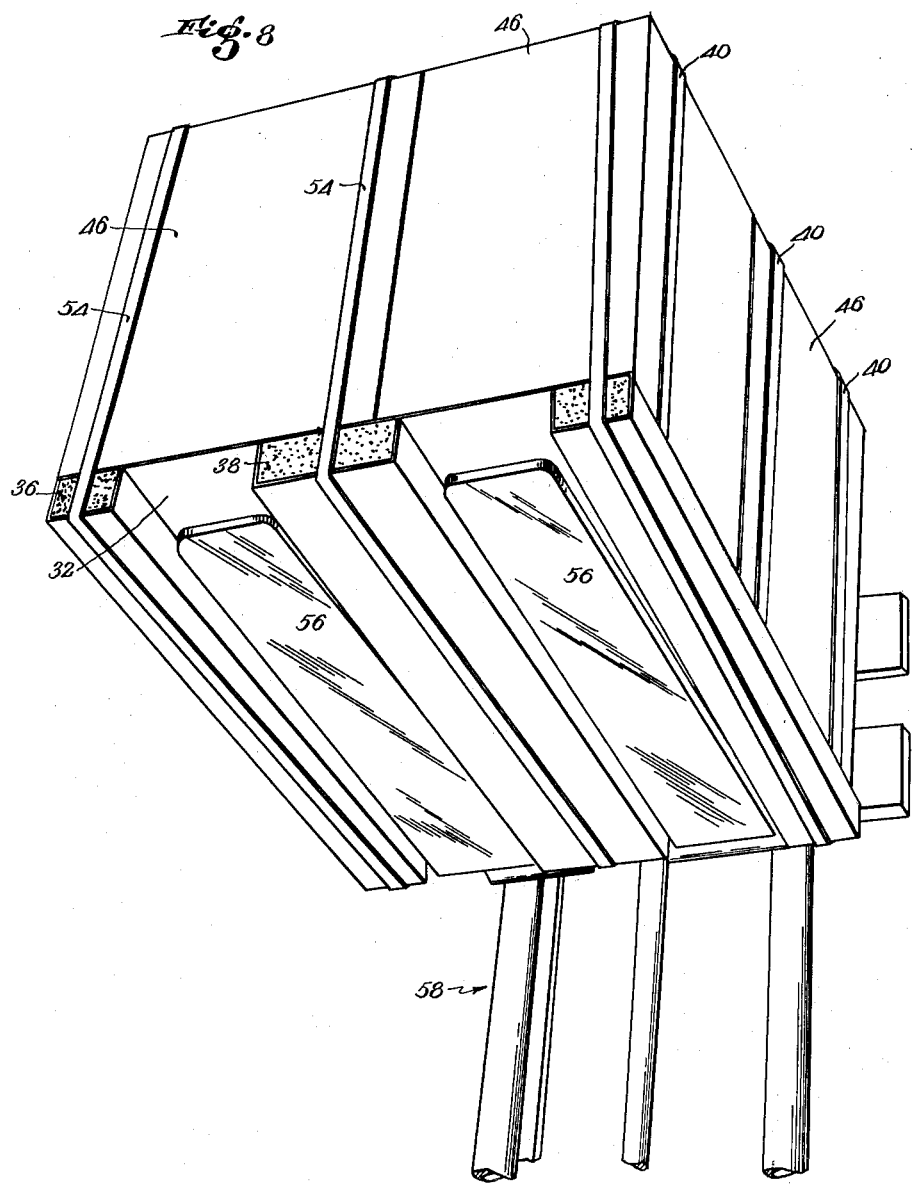
CLAUDE R. FRIESNER
Inventor May 6, 1952          C. R. FRIESNER          2,596,071
BRICK PACK
Filed Aug. 17, 1949          5 Sheets-Sheet 5
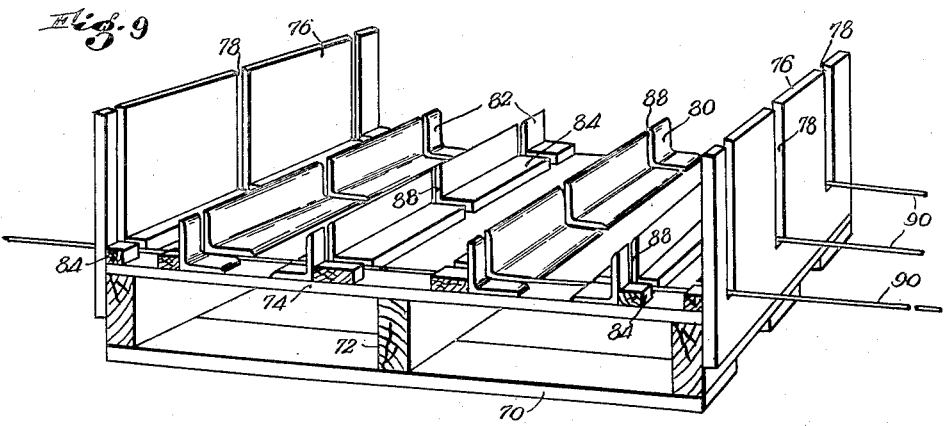
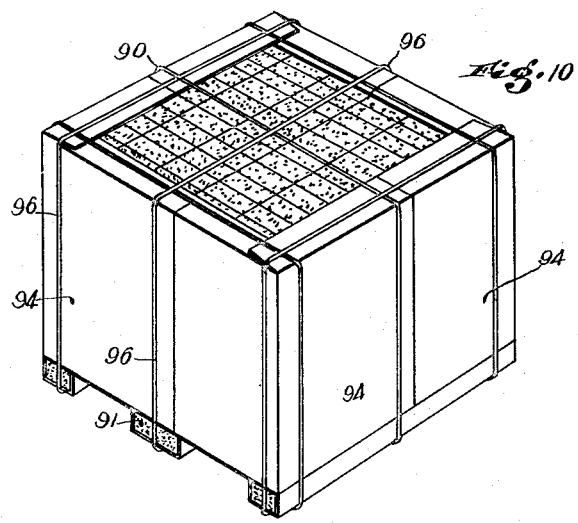
CLAUDE R. FRIESNER
Inventor Patented May 6, 1952

2,596,071

UNITED STATES PATENT OFFICE 2,596,071

BRICK PACK

Claude R. Friesner, Loudon Heights, Loudonville, N. Y., assignor to Albany Corrugated Container Corporation, Cohoes, N. Y., a corporation of New York Application August 17, 1949, Serial No. 110,723

5 Claims. (Cl. 206—65)

This invention relates to the art of packaging for shipment such objects as building bricks, fire brick, paving brick, tile, cobble stones, wooden blocks and the like, that is to say, articles of reasonably regular outline, small size and relatively great weight. For sake of convenience the term "brick" will be used herein as generic to all such objects.

The most important object of the invention is to improve the efficiency and decrease the cost of packing and shipping bricks.

Another object of the invention is to facilitate the assembling of large numbers of bricks into compact self-sustained shipping units.

Still another object of the invention is to provide a package of bricks assembled and bound into a compact stack capable of withstanding rough handling without disintegration and arranged in a form in which loading and transporting operations may be carried out with greatly increased facility and safety.

An important feature of the invention resides in a combined pallet and form by means of which a package having the desired characteristics may quickly be assembled.

Another feature of the invention comprises first forming a plurality of spaced rows of bricks, encasing said rows with tough, flexible material, laying courses of brick on the encased rows to form a compact stack supported at spaced intervals on said cased rows of bricks, and then binding first the stack and then the combination of the stack and supporting rows with metal bands.

Another feature of the invention consists in a rectangular stack of bricks, cased and bound as a unit, and bound to a plurality of spaced rows of bricks serving to provide parallel chambers for the accommodation of the forks of a lift truck.

In addition to the obvious advantages of speedy facile packaging afforded by the features of the invention, it is perhaps equally important that a package of bricks assembled in accordance with the invention is so designed that it can be handled without fear of disruption or chipping of the contents; moreover the complete package consists only of the bricks, a casing of paper board and the retaining bands. In other words, there is no heavy apparatus which adds to the shipping weight.

These and other objects and features of the invention together with incident advantages will be more readily understood and appreciated from the following detailed description of a preferred embodiment thereof selected for purposes of illustration and shown in the accompanying drawings in which:

Fig. 1 is a view in perspective of the form about which the package is assembled, Fig. 2 is a view in perspective of the form to which has been added the bottom casing sheet, Figs. 3, 4, 5, 6 and 7 are views in perspective showing the sequence of steps involved in the formation of the package, Fig. 8 is a view in perspective of a completed package elevated on the forks of a lift truck.

Fig. 9 is a view in perspective of another type of form capable of use in the assembling of a package, and Fig. 10 is a view in perspective of a package assembled on the form shown in Fig. 9.

Figure 4:
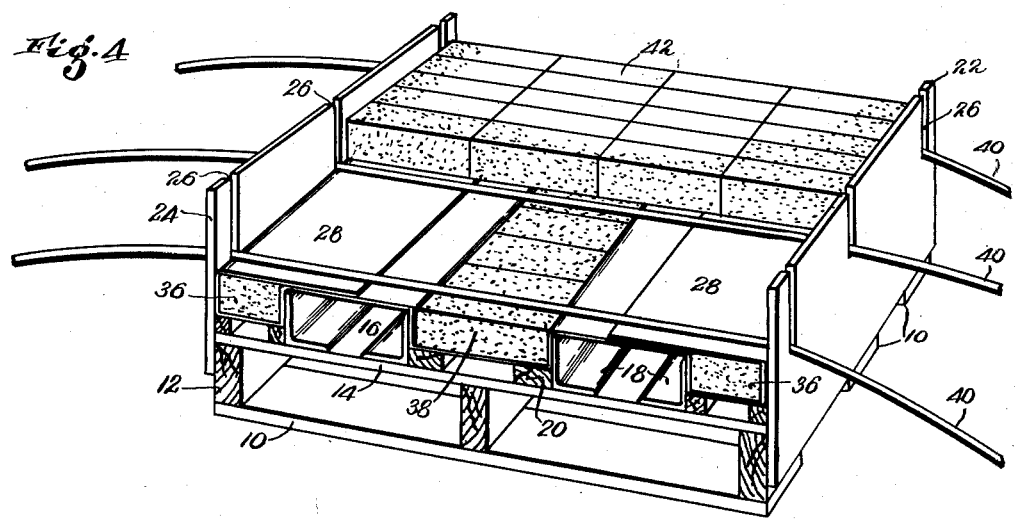

Referring first to Fig. 1, there is provided a base or form on which the bricks are assembled for packing. The form comprises three flat boards 10 arranged in parallel relation and joined by three timbers 12 secured to the boards 10 in parallel transverse arrangement. A wooden base plate or sheet 14 is secured to the upper surfaces of the timbers 12 and supports two pairs of opposed L-shaped channel irons 16 and 18. The elements thus far described are so arranged that the channel irons 16 and 18 form outer channels slightly wider than the length of a building brick. Spacing strips 20 are secured to the base plate 14 adjacent and parallel to the channel irons 16 and 18 and also adjacent the bases of a pair of opposed side walls 22 and 24 secured to the outer two of the three timbers 12 in position to extend upwardly above the upper level of the channel irons. Each of the side walls 22 and 24 is provided with three vertical slots 26 cut downwardly from the upper edge and so arranged that the slots in one side wall are opposite the slots in the other. Although the form illustrated is largely constructed of wood, any other suitable material may be substituted. For example, the entire form or pallet may be stamped or otherwise fashioned from sheet steel, or billets of steel or other metals.

Upon the form described in the preceding paragraph there is placed a sheet of heavy corrugated paper, fiberboard, chip board or the like, that is to say, a tough flexible material which may be creased and folded without rupturing but which tends to hold its folded shape. The folds are made to form a pair of upright side wall members 28 which lie flat against the inner surfaces of the side walls 22 and 24; then at either end of the form there is a flat valley 30 where the corrugated paper overlies two of the spacer strips 20 and lies against the vertical wall of the outermost channel iron. Proceeding inward, the corrugated paper then spans the parallel pairs of channel irons to form a pair of flat plateaus 32. Finally the corrugated paper is folded down to form a wide central valley 34 just long enough to accommodate a series of bricks laid transversely. The arrangement of the first course of bricks is shown in Fig. 3 wherein it will appear that in both of the outer valleys 30 there is formed a row of bricks 36, the bricks in each row being laid end to end. The bricks may be laid on their sides or faces, depending upon the manner in which the form is designed. The center valley 34 is filled with a row of bricks 38 in side by side relation.

Figure 5:
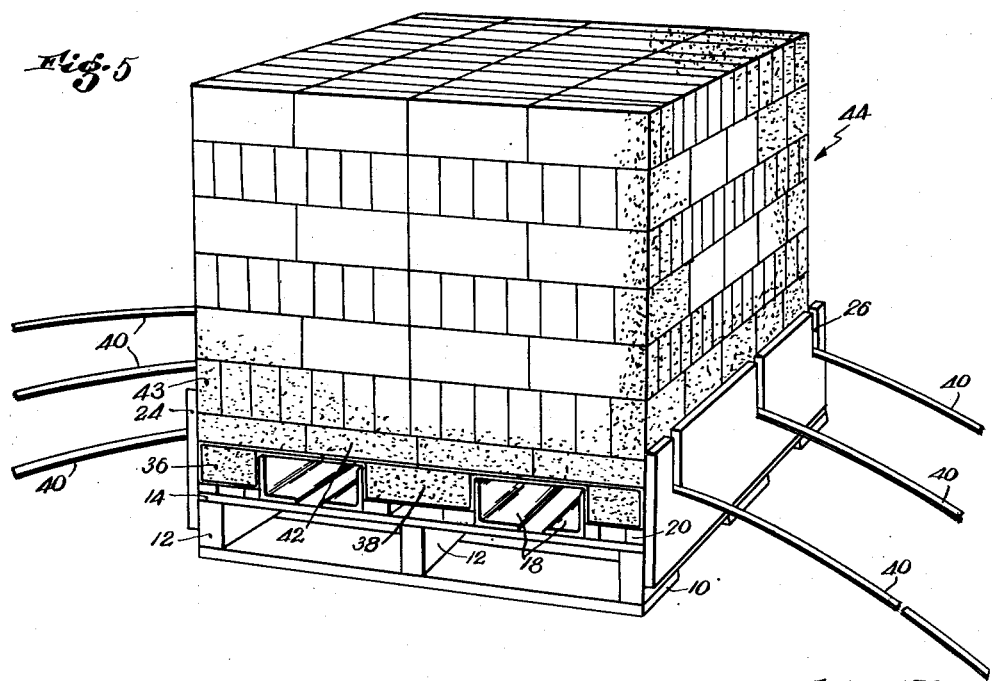

As shown in Fig. 4 the next step is to fold the upwardly extending paper side walls 28 inwardly and downwardly to lie flat across the outermost rows of bricks 36, following which three flexible steel bands 40 are inserted in the opposed pairs of slots 26 of the side walls 22 and 24 and overlying the infolded side walls 28 as well as the center row of bricks 38. Subsequently a full course of bricks is laid over the bands 40, the infolded side walls 28 and the center row of bricks 38, the bricks in the course 42 being laid side by side and parallel to the bands 40. The bricks in course 42 may be laid flat or on edge as desired. In Fig. 4 they are shown laid flat. Over the course of bricks 42 is laid a second course 43 in which the bricks are laid on edge and at right angles to the bricks in the first course 42. Then, as shown in Fig. 5, courses of bricks are laid in edgewise relation and alternating in direction until a package of 500 bricks, more or less, has been assembled as an integral stack.

The next steps in the assembly of the packages are illustrated in Fig. 6 wherein it will appear that four sheets 46 of corrugated paper are folded about the corners of the stack of bricks and overlap to form a continuous casing surrounding the side walls of the stack of bricks. Furthermore each sheet 46 is cut at the corner fold and folded at the top or creased and folded to form a flange 48 which laps over the upper margin of the stack. It will be noted that the vertical and upper horizontal edges of the stack are protected by the casing 46. The bands 40 are then drawn upwardly along the side walls of the cased stack and then bent over the top where the ends overlap. The bands 40 are stressed tightly around the stack so that compacting pressure is exerted upon the stack of bricks. The bands are then clipped together as shown at 50 or otherwise fastened together. When wire is used in place of flat steel bands, the wire ends may be twisted to fasten them together. The term "band" as used in the present application is meant to include any form or shape of binding medium, made of any suitable material, such as wire, flat metal strips, pressure-sensitive tape or other forms of binding material.

The next steps in the formation of the package are illustrated in Fig. 7. Three parallel rows of bricks 52 are placed on the upper surface of the package, overlying the corrugated paper flanges 48 and the bands 40. The bricks in the rows 52 are laid in side by side relation parallel to the bands 40. Subsequently three steel bands 54 are threaded between adjacent spacer strips 20 and beneath the three parallel bottom rows of bricks 36 and 38, drawn upwardly and across the rows of bricks 52 at the top of the package and fastened together while taut. It will now be seen that the package is held together by the three bands 40 which bind together the integral stack of bricks and their casing 46 exclusive of the three bottom rows 36 and 38 and the upper rows of bricks 52. The three bands 54 are at right angles to the bands 40 and bind together the cased stack of bricks as well as the bottom and top rows 36, 38 and 52. However, these upper rows 52 are optional and may be omitted if desired. The upper rows 52 may be employed to complete a given number of brick in the pack. They also serve to display the texture, color and other characteristics of the brick in the package.

The package is then complete and may conveniently be removed from the form by means of a fork lift truck. The forks 56 of the lift truck enter the form in the parallel open-ended chambers provided by the pairs of channel irons 16 and 18. Then the forks 56 are elevated to lift the package of bricks from the form. In Fig. 8 the package is seen from below as it is supported on the forks 56; the vertical standards of the lift truck are suggested at 58.

Thereafter the package may be deposited on any level surface and the forks of the truck withdrawn. In the completed package the bricks in the lower rows 36 and 38 serve as supporting legs or as a pallet integral with the package.

The form shown in Fig. 9 may be used in the assembly of a package by a slightly different method. This form comprises three transverse boards 70 to which three timbers 72 are secured, as before, while a continuous sheet or base plate 74 is secured to the upper surfaces of the timbers 72. Two opposed side walls are secured along their lower margins to the outermost of the three timbers 72 and extend upwardly from the plate 74. Each side wall 76 is provided with three downwardly extending slits 78 open at their upper ends and extending down approximately to the level, more or less, of the base plate 74. In an alternative embodiment, the base plate 74 may be channelled or grooved at the location of the slits 78 to facilitate the passage of the bands 80 from one sidewall to the other.

Secured to the upper surface of the base plate 74 are two pairs of opposed channel irons 80 and 82 composed of aligned sections separated, as it were, by slots 88. As before, flat parallel spacers 84, also sectioned or slotted, are secured to the base plate 74 at the base of the side walls 76 and contiguous with the flat vertical walls of the channel irons 80 and 82. The package of bricks is then assembled exactly as described in conjunction with Figs. 1-8. That is to say, corrugated paper is folded over the form, the bottom rows of bricks are laid in, and an integral stack of bricks is formed and cased. The first set of bands 90 include this time the bottom rows or bricks as well as the cased stack. Thus the bottom rows of bricks are given more support than in the previously described embodiment. The casing is formed by four sheets 94 of corrugated paper. Then the second set of bands or wires 96 are bound as before about the stack as well as the three bottom rows of bricks. As shown in Fig. 10 the top of the package is flat and the three upper rows shown in Fig. 7 are dispensed with. This may be accomplished by laying the bricks in the first course 42 (Fig. 7) on edge, if the same total number of bricks as in Fig. 7 is desired, and completing the final course of bricks with a few bricks laid flat and the remainder on edge.

An advantage of the package shown in Figs. 9 and 10 is the fact that the banding or strapping is all done at the same time after the package has been completely assembled, whereas in the package shown in Fig. 7 the bands 40 are secured in position, the top rows 52 are then laid in position and then the bands 54 are secured in position.

Although I prefer to use flexible steel wires for the strapping of the package of bricks, I also contemplate the use of the flat bands; the wires, however, are less likely to cut through the corrugated paper casing and grind against the edges of the bricks.

The casing which covers the side walls and the top margin of the stack serves to hold the bricks in place beneath the bands or wires and have been found to be an essential element of the integral package. With the casing in place, it has been found that there is substantially no tendency for the faces and edges of the bricks to rub together and thereupon cause disintegration and/or disfigurement of the bricks.

As an alternative embodiment of the present invention, the structure comprising the flat boards 10 and the timber 12 shown in Fig. 1 may be eliminated and the base plate 14 may be set directly on the floor or ground prior to preparation of the package. To accomplish this embodiment, the side walls 22 and 24 are made to extend only to the bottom edge of the base plate 14.

Having thus disclosed my invention what I claim as new and desire to secure by Letters Patent of the United States is:

1. A package of bricks comprising a plurality of at least three spaced parallel rows of bricks, said rows encased on the bottom and long sides thereof by a continuous sheet of tough flexible material, said flexible material creased at the long edges of said rows and continued between said rows as arches between respective rows, the ends of said flexible material being folded over the top portion of the end rows and overlying a portion of said arches, a plurality of layers of bricks stacked on said rows to form a compact rectangular stack and to secure that portion of the flexible material overlying said end rows and said arches, a plurality of sheets of tough flexible material overlapped and folded to provide a continuous covering for the side walls of said stack, a first set of bands encircling said stack above and at right angles to said rows of bricks and a second set of bands encircling said stack and said rows, said second set of bands being disposed on and parallel to said rows of bricks.

2. The package defined in claim 1 wherein a plurality of spaced rows of bricks are disposed on the top of the stack over one set of bands and beneath the other.

3. A package of bricks comprising a plurality of at least three spaced parallel rows of bricks, said rows encased on the bottom and long sides thereof by a continuous sheet of tough flexible material, said flexible material creased at the long edges of said rows and continued between said rows as arches between respective rows, the ends of said flexible material being folded over the top portion of the end rows and overlying a portion of said arches, a plurality of layers of bricks stacked on said rows to form a compact rectangular stack and to secure that portion of the flexible material overlying said end rows and said arches, a plurality of sheets of tough flexible material overlapped and folded to provide a continuous covering for the side walls of said stack, a first set of bands encircling said stack and said rows of bricks at right angles to said rows of bricks, and a second set of bands encircling said stack and said rows, said second set of bands being disposed on and parallel to said rows of bricks.

4. A package of bricks comprising a plurality of at least three spaced parallel rows of bricks, said rows encased on the bottom and long sides thereof by a continuous sheet of corrugated paper, said corrugated paper creased transversely to the corrugations thereof at the long edges of said rows and continued between said rows as arches between respective rows, the ends of said corrugated paper being folded over the top portion of the end rows and overlying a portion of said arches, a plurality of layers of bricks stacked on said rows to form a compact rectangular stack and to secure that portion of the corrugated paper overlying said end rows and said arches, a plurality of sheets of tough flexible material overlapped and folded to provide a continuous covering for the side walls of said stack, a first set of bands encircling said stack above and at right angles to said rows of bricks, and a second set of bands encircling said stack and said rows, said second set of bands being disposed on and parallel to said rows of bricks.

5. A package of bricks comprising a plurality of at least three spaced parallel rows of bricks, said rows encased on the bottom and long sides thereof by a continuous sheet of corrugated paper, said corrugated paper creased transversely to the corrugations thereof at the long edges of said rows and continued between said rows as arches between respective rows, the ends of said corrugated paper being folded over the top portion of the end rows and overlying a portion of said arches, a plurality of layers of bricks stacked on said rows to form a compact rectangular stack and to secure that portion of the corrugated paper overlying said end rows and said arches, a plurality of sheets of corrugated paper overlapped and folded to provide a continuous covering for the side walls of said stack, a first set of bands encircling said stack and said rows of bricks at right angles to said rows of bricks, and a second set of bands encircling said stack and said rows, said second set of bands being disposed on and parallel to said rows of bricks.

CLAUDE R. FRIESNER.

REFERENCES CITED

The following references are of record in the file of this patent:

UNITED STATES PATENTS

| Number | Name | Date |
|---|---|---|
| 171,229 | Kepple | Dec. 21, 1875 |
| 1,561,210 | Borraem | Nov. 10, 1925 |
| 1,899,125 | Weis | Feb. 28, 1933 |
| 1,922,560 | Sullivan | Aug. 15, 1933 |
| 2,005,117 | Tamplin | June 18, 1935 |
| 2,300,511 | Lamb | Nov. 3, 1942 |
| 2,404,205 | Ammon | July 16, 1946 |
| 2,496,984 | Clark | Feb. 7, 1950 |